(12) United States Patent
Pierro et al.

(10) Patent No.: US 6,647,356 B2
(45) Date of Patent: Nov. 11, 2003

(54) SYSTEM AND METHOD FOR REMOTE INBOUND VEHICLE INSPECTION

(75) Inventors: Michael James Pierro, Erie, PA (US); Richard Gerald Bliley, Erie, PA (US); William Roy Schneider, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/071,219

(22) Filed: Feb. 7, 2002

(65) Prior Publication Data
US 2002/0116149 A1 Aug. 22, 2002

Related U.S. Application Data

(63) Continuation of application No. 09/378,940, filed on Aug. 23, 1999.

(51) Int. Cl.[7] ............................ G06F 15/18; G06F 19/00
(52) U.S. Cl. ........................... 702/184; 701/29; 701/35; 706/50
(58) Field of Search .................... 700/99–100; 714/48; 340/10.34; 702/58, 82, 182, 183, 184; 701/29, 35; 706/50

(56) References Cited

U.S. PATENT DOCUMENTS

| | | | | |
|---|---|---|---|---|
| 5,058,044 A | | 10/1991 | Stewart et al. | 702/184 |
| 5,099,436 A | * | 3/1992 | McCown et al. | 702/82 |
| 5,123,017 A | * | 6/1992 | Simpkins et al. | 714/26 |
| 5,163,330 A | * | 11/1992 | Tidiere et al. | 73/849 |
| 5,559,710 A | | 9/1996 | Shahraray et al. | 700/100 |
| 5,845,272 A | | 12/1998 | Morjaria et al. | 706/50 |
| 5,931,877 A | * | 8/1999 | Smith et al. | 701/29 |
| 5,995,888 A | | 11/1999 | Hagenbuch | 701/35 |

* cited by examiner

Primary Examiner—John Barlow
Assistant Examiner—John Le
(74) Attorney, Agent, or Firm—Gerald W. Spinks

(57) ABSTRACT

A system and method for reducing the shop lime of a vehicle, e.g., a locomotive, at a maintenance facility by obtaining onboard systems parameter data during a period when the vehicle is inbound to the maintenance facility for required periodic scheduled maintenance, and by determining, at the maintenance facility and prior to arrival of the vehicle at the maintenance facility, from the data received from the inbound vehicle, whether any of the data is out of a predetermined range or is trending to be out of range.

4 Claims, 2 Drawing Sheets

SYSTEM AND METHOD FOR REMOTE INBOUND VEHICLE INSPECTION

CROSS REFERENCE TO RELATED APPLICATIONS

This is a continuation patent application of co-pending U.S. patent application Ser. No. 09/378,940, filed on Aug. 23, 1999, and entitled "System and Method for Remote Inbound Vehicle Inspection."

STATEMENT REGARDING FEDERALLY SPONSORED RESEARCH OR DEVELOPMENT

Not Applicable

BACKGROUND OF THE INVENTION

1. Field of the Invention

The present invention relates to vehicle maintenance and repair.

2. Background Art

Currently, vehicles such as locomotives are inspected at the repair shop when the locomotive arrives for periodic scheduled maintenance. The in-shop inspection process is conducted as soon as possible upon arrival of the locomotive at the shop, because reduced shop time results in increased availability and usability of a locomotive. The in-shop inspection process typically takes several days to complete. The results of the inspection determine which, if any, systems must be corrected during the periodic scheduled maintenance and which fault correction and maintenance actions must be taken.

The Federal Railroad Administration (FRA) currently requires an inspection every 92 days, and the locomotive is, of course, out of service during such periodic inspection and maintenance period.

Due to the high value of reducing overall shop time, any system or process to reduce such shop time would be very desirable.

BRIEF SUMMARY OF THE INVENTION

The present invention provides a remotely operated inbound inspection system and method for reducing or eliminating in-shop inspection of vehicles, such as locomotives. The invention also provides a remotely operated system and method for reducing the shop time for vehicles, e.g., locomotives, during their periodic, scheduled inspections. The invention also provides a system and method for expediting the servicing of vehicles, e.g., locomotives, at a repair shop, by gathering system related data, sending the data to a remote maintenance facility, and evaluating potential problems and work elements at the remote maintenance facility, prior to arrival of the vehicle at the shop.

The novel features of this invention, as well as the invention itself, will be best understood from the attached drawings, taken along with the following description, in which similar reference characters refer to similar parts, and in which:

DETAILED DESCRIPTION OF THE INVENTION

While the present invention can be applied to any vehicle, such as an aircraft, which has complex systems which must be maintained on a periodic scheduled basis at a maintenance facility, the invention will be illustrated with reference to locomotives.

Figure 1:
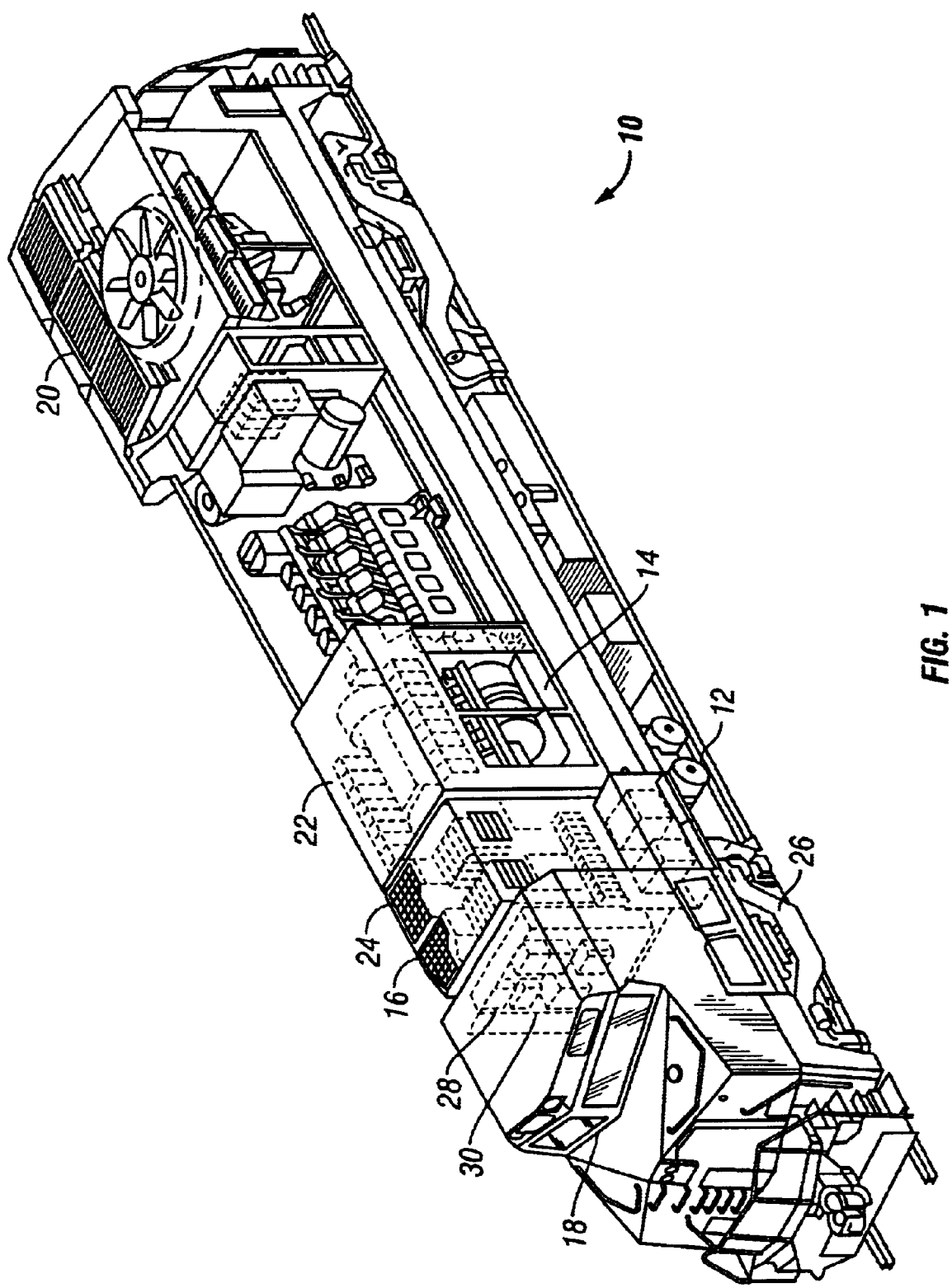
FIG. 1 shows a schematic of a typical locomotive which can be adapted to implement the method of the present invention.

FIG. 1 shows a schematic of an exemplary locomotive 10 which can implement the method of the present invention. The locomotive 10 may be either an AC or DC locomotive. The locomotive 10 is comprised of several complex systems, each performing separate functions. Some of the equipment systems and their functions are listed below. Note that the locomotive 10 is also comprised of many other equipment systems, and that the present invention is not limited to functioning with the equipment systems disclosed herein.

An air supply and air brake system 12 provides compressed air to the locomotive, which uses the compressed air to actuate the air brakes on the locomotive and cars behind it. An auxiliary alternator system 14 powers all auxiliary equipment. In particular, it supplies power directly to an auxiliary blower motor and an exhauster motor. Other equipment in the locomotive is powered through a cycle skipper. A battery and cranker system 16 provides voltage to maintain the battery at an optimum charge and supplies power for operation of a DC bus and an HVAC system.

An intra-consist communications system collects, distributes, and displays consist data across all locomotives in the consist. A cab signal system 18 links the wayside to the train control system. In particular, the cab signal system 18 receives coded signals from the rails through track receivers located on the front and rear of the locomotive. The information received is used to inform the locomotive operator of the speed limit and operating mode. A distributed power control system provides remote control capability of multiple locomotive consists anywhere in the train. It also provides for control of tractive power in motoring and braking, as well as air brake control.

An engine cooling system 20 provides the means by which the engine and other components reject heat to the cooling water. In addition, it minimizes engine thermal cycling by maintaining an optimal engine temperature throughout the load range and prevents overheating in tunnels.

An end of train system provides communication between the locomotive cab and last car via a radio link, for the purpose of emergency braking. An equipment ventilation system 22 provides the means to cool the locomotive equipment. An event recorder system records FRA required data and limited defined data for operator evaluation and accident investigation. It can store up to 72 hours of data, for example. A fuel monitoring system provides means for monitoring the fuel level and relaying the information to the crew. An exemplary global positioning system uses satellite signals to provide accurate position, velocity, and altitude measurements to the control system. A mobile communications package system provides the main data link between the locomotive and the wayside via a 900 MHz radio.

A propulsion system 24 provides the means to move the locomotive. It also includes the traction motors and dynamic braking capability. In particular, the propulsion system 24 receives power from the traction alternator and through the traction motors converts it to locomotive movement. A shared resources system includes the I/O communication devices, which are shared by multiple equipment systems. A traction alternator system 26 converts mechanical power to electrical power which is then provided to the propulsion system. A vehicle control system reads operator inputs and determines the locomotive operating modes.

The above-mentioned systems are monitored by a locomotive control system 28. The locomotive control system 28 keeps track of any incidents occurring in the systems with an incident log. The aforementioned systems can be found on a typical locomotive currently in service. The method of the present invention gathers data from such systems and utilizes it as described below to facilitate maintenance and repair of the locomotive with a minimum amount of locomotive down time.

The locomotive 10 may optionally include an onboard diagnostic system 30 similar to that described in U.S. Pat. No. 5,845,272 assigned to General Electric Company. Such a diagnostic system 30 can be implemented on a computer, and it can comprise a number of sensors which monitor the equipment system parameters of the locomotive. The diagnostic system 30 may also detect some faults in the monitored locomotive systems. Such a fault detection system can be augmented and further adapted to practice the method of the present invention, as described below. More specifically, the parameters which are monitored by an onboard diagnostics system currently produce data which is only processed onboard, and stored in onboard memory. According to the present invention, the onboard diagnostics system 30 is adapted to further utilize this currently available data to reduce vehicle downtime, by transmitting the data to the maintenance shop in advance of arrival of the locomotive at the shop, by means such as a satellite or cellular telephone signal. At the maintenance facility, this information is further processed as described below, and compared with other data not available onboard the locomotive, to establish a maintenance and repair program for the vehicle, before its arrival at the shop.

Figure 2:
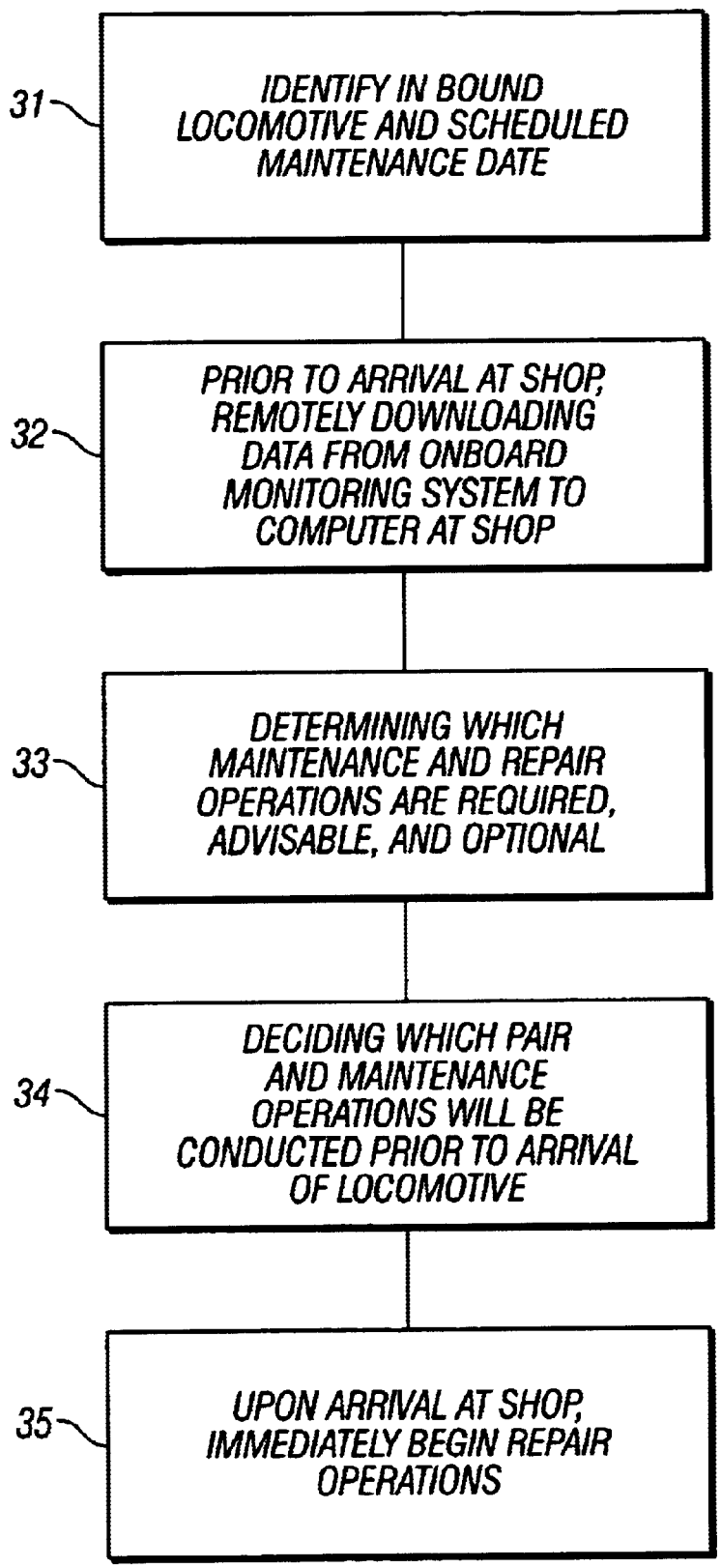
FIG. 2 is a flow chart of a preferred embodiment of the method of the present invention which can be implemented in the type of vehicle shown in FIG. 1, for conducting remote inbound inspection of such locomotives or other complex vehicles.

FIG. 2 generally illustrates in block diagram a system according to the present invention, for performing a method of inspecting remote inbound vehicles comprising first identifying an inbound locomotive and its scheduled maintenance date, in step 31. The maintenance schedule for the locomotive is kept at a computer in the shop or at the management office of the locomotive owner, which can be a railroad company.

Prior to arrival of the locomotive at the shop, the shop computer sends a signal to the locomotive's onboard computer and instructs it to transmit data on all monitored parameters, in step 32. The shop computer contains a vast amount of historical and empirical data pertaining to most systems used in various locomotive models, and it uses that data according to an algorithm to classify various maintenance and repair operations as "required", "advisable", or "optional", in step 33, for the particular locomotive which is inbound at the time.

A report is then generated while the vehicle is still inbound, and sent to the owner, listing the "required", "advisable", and "optional" operations for that locomotive. Decisions can be made by experienced management personnel at the maintenance facility, in step 34, as to which of the "advisable" and "optional" maintenance operations will be performed when the locomotive arrives at the shop.

The method of the present invention envisions beginning repair operations immediately upon arrival of the locomotive at the shop, as in step 35, obviating the requirement of a time-consuming inspection and decision-making process after arrival of the locomotive in the shop.

Many vehicle system operating parameters are monitored, and trends are calculated on a subset of those parameters, or on all of the parameters. Among the parameters which are usually monitored for locomotives, for downloading in step 32, are ambient air temperature, train notch, total track and force power, total voltage, total amps, software versions, engine RPM, engine temperature, crankcase pressure, dynamic braking, battery voltage, and voltage and amperage for all auxiliary motors. For other vehicles, other sets of parameters may be monitored.

The trends are calculated, in step 33, by comparing values for a given parameter over a period of time and comparing those values with historical data for identical vehicle systems. This enables rapid and accurate correlation of trending data with a dedicated fault occurrence experience database. The trends are preferably calculated based in part on prior downloads collected in the database. The database is preferably continually updated and may be stored in the memory of the shop computer or off-site whereby it may be accessed on-line.

A locomotive 10 which has been adapted to implement the present invention preferably includes an onboard diagnostics system 30, similar to currently known data gathering systems, but further adapted to practice the present invention. The parameters which are monitored by currently known onboard diagnostics systems produce data used only for onboard processing, and for storage in onboard memory. In practice of the present invention, the data collection and processing equipment on the locomotive is adapted to further utilize this currently available data to reduce vehicle downtime by transmitting the data to the shop by means such as a satellite or cellular telephone signal. Prior to a scheduled inspection at a repair shop, communication between the onboard diagnostics system 30 and the remote monitoring station is initiated. Then, data processing and comparison, as well as decision making, are accomplished while the vehicle is still operating. As a result, several hours or even days of costly inspection and decision-making time are eliminated or shifted into the vehicle operating time and out of the vehicle down time.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

We claim:

1. A method of reducing the shop time of locomotives at a locomotive maintenance facility comprising:

providing data gathering systems onboard a locomotive and a computer at a remote locomotive maintenance facility, said computer having a historical data base of locomotive system data on a plurality of similar locomotives, said locomotive system data being selected from the group consisting of ambient air temperature, train notch, total track and force power, total voltage, total amps, software versions, engine RPM, engine temperature, crankcase pressure, dynamic braking, battery voltage, and voltage and amperage for all auxiliary motors;

obtaining onboard locomotive systems data with said onboard data gathering systems during operation of said locomotive, prior to arrival of said locomotive at said locomotive maintenance facility for scheduled maintenance;

transmitting said onboard systems data via wireless communications to said maintenance facility prior to arrival of said locomotive at said maintenance facility;

operating said computer at said maintenance facility, prior to arrival of said locomotive at said maintenance facility, to compare said onboard system data with said historical data base to determine whether any of said onboard system data is out of a predetermined range or is within said predetermined range, but exhibiting a trend toward being out of said range;

operating said computer at said maintenance facility, prior to arrival of said locomotive at said maintenance facility, to assign at least one fault code corresponding to at least one system fault based on said onboard systems data being either out of said range or exhibiting a trend toward being out of said range, said at least one fault code being selected from the group consisting of overcurrents, flashovers, crankcase overtemperatures, crankcase overpressures, communication failures, electrical around failures, air conditioner converter failures, propulsion system faults, auxiliary system faults, propulsion motor faults, auxiliary motor faults, auxiliary system charging faults, engine cooling system faults, oil system faults, control wiring faults, and microelectronics faults; and operating said computer at said maintenance facility, prior to arrival of said locomotive at said maintenance facility, to determine any maintenance and repair operations to be performed when said inbound locomotive arrives at said maintenance facility, in response to said at least one fault code.

2. The method recited in claim 1, further comprising operating said computer at said maintenance facility, prior to arrival of said locomotive at said maintenance facility, to classify each said maintenance and repair operation into a classification selected from the group consisting of required, advisable, and optional operations.

3. The method recited in claim 1, wherein said onboard systems data is determined to be within said predetermined range, but exhibiting a trend toward being out of range by comparing a series of values for a given parameter over a period of time.

4. The method recited in claim 1, wherein said historical data base is comprised, at least in part, of data collected from prior downloads of onboard systems data.

* * * * *